United States Patent
Sasahara et al.

(10) Patent No.: US 10,586,126 B2
(45) Date of Patent: Mar. 10, 2020

(54) CHANGE DEGREE DERIVING APPARATUS, CHANGE DEGREE DERIVING METHOD AND NON-TRANSITORY COMPUTER READABLE MEDIUM

(71) Applicant: FUJI XEROX CO., LTD., Tokyo (JP)

(72) Inventors: Shinji Sasahara, Kanagawa (JP); Hitoshi Ogatsu, Kanagawa (JP); Junichi Matsunoshita, Kanagawa (JP); Ken Ogino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 236 days.

(21) Appl. No.: 15/344,870

(22) Filed: Nov. 7, 2016

(65) Prior Publication Data
US 2017/0316279 A1 Nov. 2, 2017

(30) Foreign Application Priority Data

May 2, 2016 (JP) .................................. 2016-092705

(51) Int. Cl.
*G06T 7/90* (2017.01)
*G06K 9/46* (2006.01)
*G06T 7/00* (2017.01)

(52) U.S. Cl.
CPC ......... *G06K 9/4647* (2013.01); *G06K 9/4652* (2013.01); *G06T 7/001* (2013.01); *G06T 7/90* (2017.01); *G06T 2207/10024* (2013.01)

(58) Field of Classification Search
CPC ............... G06K 9/4652; G06K 9/4647; G06T 2207/10024; G06T 7/408; G06T 7/001; G06T 7/90
See application file for complete search history.

(56) References Cited

U.S. PATENT DOCUMENTS 5,133,022 A * 7/1992 Weideman ................ G06T 5/40
358/447
6,118,895 A * 9/2000 Hirota ...................... H04N 1/56
358/522

(Continued)

FOREIGN PATENT DOCUMENTS

JP 2014-196926 A 10/2014

OTHER PUBLICATIONS

Shyang-Lih Chang, Li-Shien Chen, Yun-Chung Chung, and Sei-Wan Chen; "Automatic License Plate Recognition"; IEEE, Mar. 2004.*

(Continued)

*Primary Examiner* — Shaghayegh Azima
(74) *Attorney, Agent, or Firm* — Oliff PLC (57) ABSTRACT

A change degree deriving apparatus includes a receiving unit and a deriving unit. The receiving unit is configured to receive first image data of an object including an achromatic color and a first color and reference image data of the object. The first image data relates to the first color. The reference image data serves as a reference. The deriving unit is configured to derive a change degree of the object from a first difference based on the first image data and the reference image data received by the receiving unit. The first difference is a difference between the first image data and the reference image data, which occurs at a chromatic color portion when a portion corresponding to the achromatic color is set as a reference.

7 Claims, 8 Drawing Sheets

(56) References Cited

U.S. PATENT DOCUMENTS

| | | | | |
|---|---|---|---|---|
| 6,449,060 B1* | 9/2002 | Kawai | H04N 1/40012 | 358/1.9 |
| 7,427,992 B2* | 9/2008 | Fukao | H04N 1/6052 | 345/581 |
| 7,689,050 B2* | 3/2010 | Sakaue | H04N 1/4072 | 382/239 |
| 2001/0005429 A1* | 6/2001 | Ishiga | H04N 9/045 | 382/167 |
| 2001/0016065 A1* | 8/2001 | Yamamoto | G06K 9/00463 | 382/173 |
| 2002/0106109 A1* | 8/2002 | Retterath | G08G 1/096758 | 382/104 |
| 2002/0196472 A1* | 12/2002 | Enomoto | G06T 5/006 | 358/3.26 |
| 2005/0078879 A1* | 4/2005 | Sakurai | G06T 3/0006 | 382/275 |
| 2006/0164700 A1* | 7/2006 | Hayashi | H04N 1/6033 | 358/518 |
| 2006/0176400 A1* | 8/2006 | Shimizu | H04N 1/56 | 348/570 |
| 2007/0285529 A1* | 12/2007 | Imamura | H04N 9/045 | 348/222.1 |
| 2008/0232684 A1* | 9/2008 | Harada | G06K 9/2018 | 382/165 |
| 2010/0020193 A1* | 1/2010 | Zhang | G06T 5/009 | 348/223.1 |
| 2010/0091348 A1* | 4/2010 | Iwamoto | G06T 5/009 | 358/518 |
| 2010/0165137 A1* | 7/2010 | Koishi | G02B 21/365 | 348/222.1 |
| 2010/0245552 A1* | 9/2010 | Higuchi | A61B 1/00096 | 348/68 |
| 2011/0033086 A1* | 2/2011 | Kubota | H04N 5/23229 | 382/103 |
| 2011/0286665 A1* | 11/2011 | Umeda | H04N 1/6086 | 382/167 |
| 2012/0133733 A1* | 5/2012 | Sakaniwa | H04N 13/15 | 348/43 |
| 2012/0188399 A1* | 7/2012 | Zhang | H04N 9/735 | 348/223.1 |
| 2013/0021628 A1* | 1/2013 | Nakamura | H04N 1/6055 | 358/1.9 |
| 2013/0083050 A1* | 4/2013 | Yamada | G06T 11/40 | 345/589 |
| 2013/0148883 A1* | 6/2013 | Lee | G06K 9/3241 | 382/165 |
| 2013/0172094 A1* | 7/2013 | Ueda | A63B 69/36 | 473/221 |
| 2013/0177239 A1* | 7/2013 | Ueda | G06K 9/4652 | 382/165 |
| 2013/0315482 A1* | 11/2013 | Iwamoto | G06T 11/001 | 382/167 |
| 2014/0293380 A1* | 10/2014 | Hasegawa | H04N 1/56 | 358/505 |
| 2015/0146224 A1* | 5/2015 | Shimamura | H04N 1/00082 | 358/1.13 |
| 2015/0213627 A1* | 7/2015 | Ahn | G06T 11/001 | 345/603 |
| 2015/0221077 A1* | 8/2015 | Kawabata | G06T 7/001 | 382/141 |
| 2015/0348505 A1* | 12/2015 | Pyo | G09G 5/10 | 345/589 |
| 2016/0026893 A1* | 1/2016 | Hoya | G06K 9/4652 | 382/165 |
| 2016/0379577 A1* | 12/2016 | Han | G09G 3/3607 | 345/690 |
| 2017/0200058 A1* | 7/2017 | Lin | G06K 9/3241 | |
| 2017/0359534 A1* | 12/2017 | Li | H04N 5/2258 | |

OTHER PUBLICATIONS

Vitabile, G. Pollaccia, G. Pilato and F. Sorbello ; "Road signs recognition using a dynamic pixel aggregation technique in the HSV color space."; Research gate, Jan. 2001.*

* cited by examiner

CHANGE DEGREE DERIVING APPARATUS, CHANGE DEGREE DERIVING METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-092705 filed May 2, 2016.

BACKGROUND

Technical Field

The present invention relates to a change degree deriving apparatus, a change degree deriving method and a non-transitory computer readable medium.

SUMMARY

According to an aspect of the invention, a change degree deriving apparatus includes a receiving unit and a deriving unit. The receiving unit is configured to receive first image data of an object including an achromatic color and a first color and reference image data of the object. The first image data relates to the first color. The reference image data serves as a reference. The deriving unit is configured to derive a change degree of the object from a first difference based on the first image data and the reference image data received by the receiving unit. The first difference is a difference between the first image data and the reference image data, which occurs at a chromatic color portion when a portion corresponding to the achromatic color is set as a reference.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the accompanying drawings.

Figure 1:
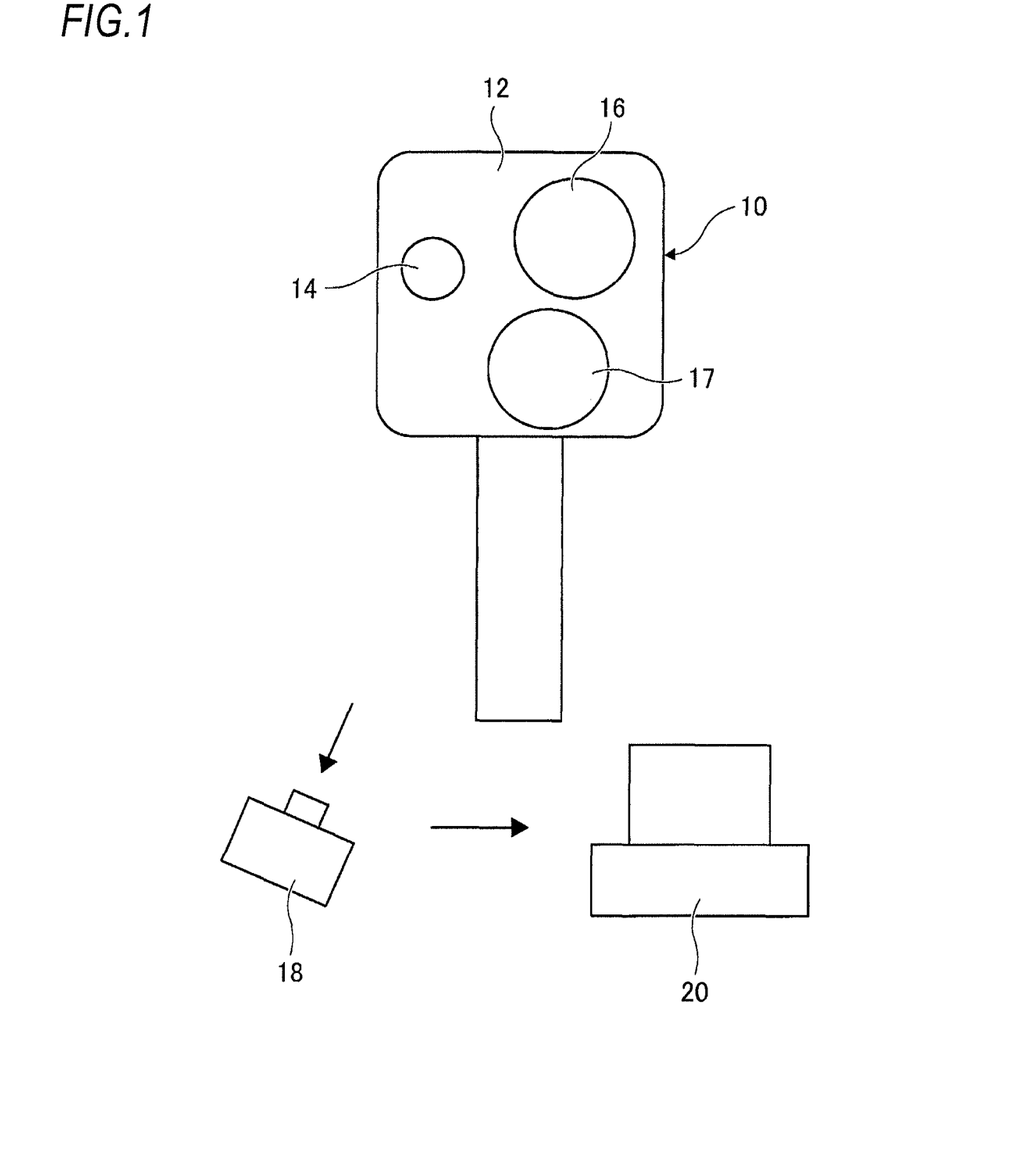
FIG. 1 is a diagram illustrating a deterioration measuring system according to an exemplary embodiment of the present invention.

FIG. 1 is a diagram illustrating a change degree derivation system according to an exemplary embodiment of the present invention. Hereinafter, description will be made assuming that a deterioration of an object is measured, and the term "change degree derivation" is replaced by a term "deterioration measurement" in the description.

An object 10 for which a deterioration measurement is to be performed is, for example, a signboard, and is provided at a place where a direct measurement is difficult (such as a high place). The object 10 includes, for example, a translucent body, and includes, for example, a white portion 12 which is an example of an achromatic color, a red portion 14, a green portion 16, and a blue portion 17. In addition, the object 10 includes a light source (e.g., a white LED) disposed therein, and light emitted from the light source is adapted to transmit through the object 10.

An image capturing apparatus 18 may be a digital camera, a smartphone, a tablet PC, or the like, and captures the object 10 and surroundings of the object 10.

A deterioration measuring apparatus 20, which is, for example, a personal computer, is configured to receive the image data obtained by capturing the object 10 using the image capturing apparatus 18, and process the image data.

Figure 2:
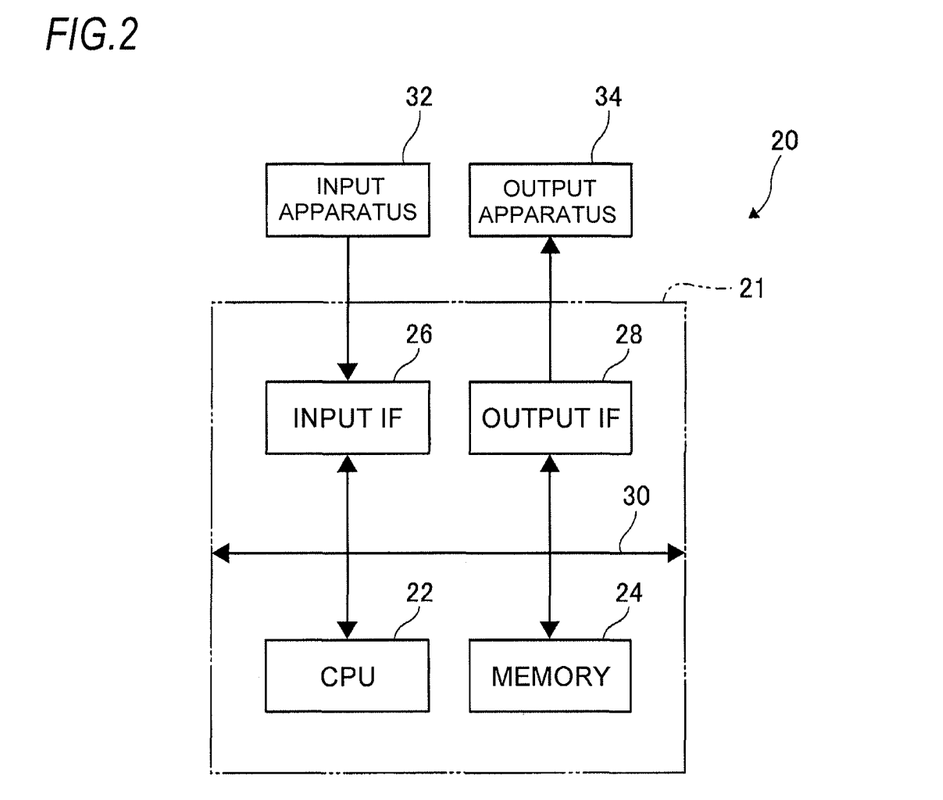
FIG. 2 is a block diagram illustrating hardware of a deterioration measuring apparatus according to the exemplary embodiment of the present invention.

FIG. 2 is a block diagram illustrating the deterioration measuring apparatus 20.

The deterioration measuring apparatus 20 includes a CPU 22, a memory 24, an input interface 26, and an output interface 28, which are connected through a control bus 30.

The CPU 22 executes a predetermined processing based on a control program stored in the memory 24. An input apparatus 32 is connected to the input interface 26. Examples of the input apparatus 32 include a connector that is directly connected to the above described image capturing apparatus 18 for input and an apparatus that inputs in wireless manner through a communication. Also, an output apparatus 34 is connected to the output interface 28. The output apparatus 34 is a display or a printer, through which a result such as processed data is output.

Hereinafter, description will be made on a deterioration measuring method of the object 10 using the deterioration measuring apparatus 20.

Generally speaking, a deterioration rate varies depending on colors. For example, it is considered that a yellow color changes over time, decolors due to light (primarily ultraviolet rays), and most rapidly deteriorates. The exemplary embodiment intends to measure a deterioration of the object 10 using the fact that a deterioration rate varies depending on colors. Achromatic colors also deteriorate in a strict sense. However, the inventors pursue intensive studies, notice that the achromatic colors less deteriorate as compared to chromatic colors, and conceive that deterioration determination is made based on device-dependent captured data without using a known color body (body whose color is known). Especially, in the present exemplary embodiment, a color change caused by capture conditions or environment light is corrected by using an achromatic portion of the object as a substitute for a known color body, and a change degree of a target color on the object is measured.

Figure 3:
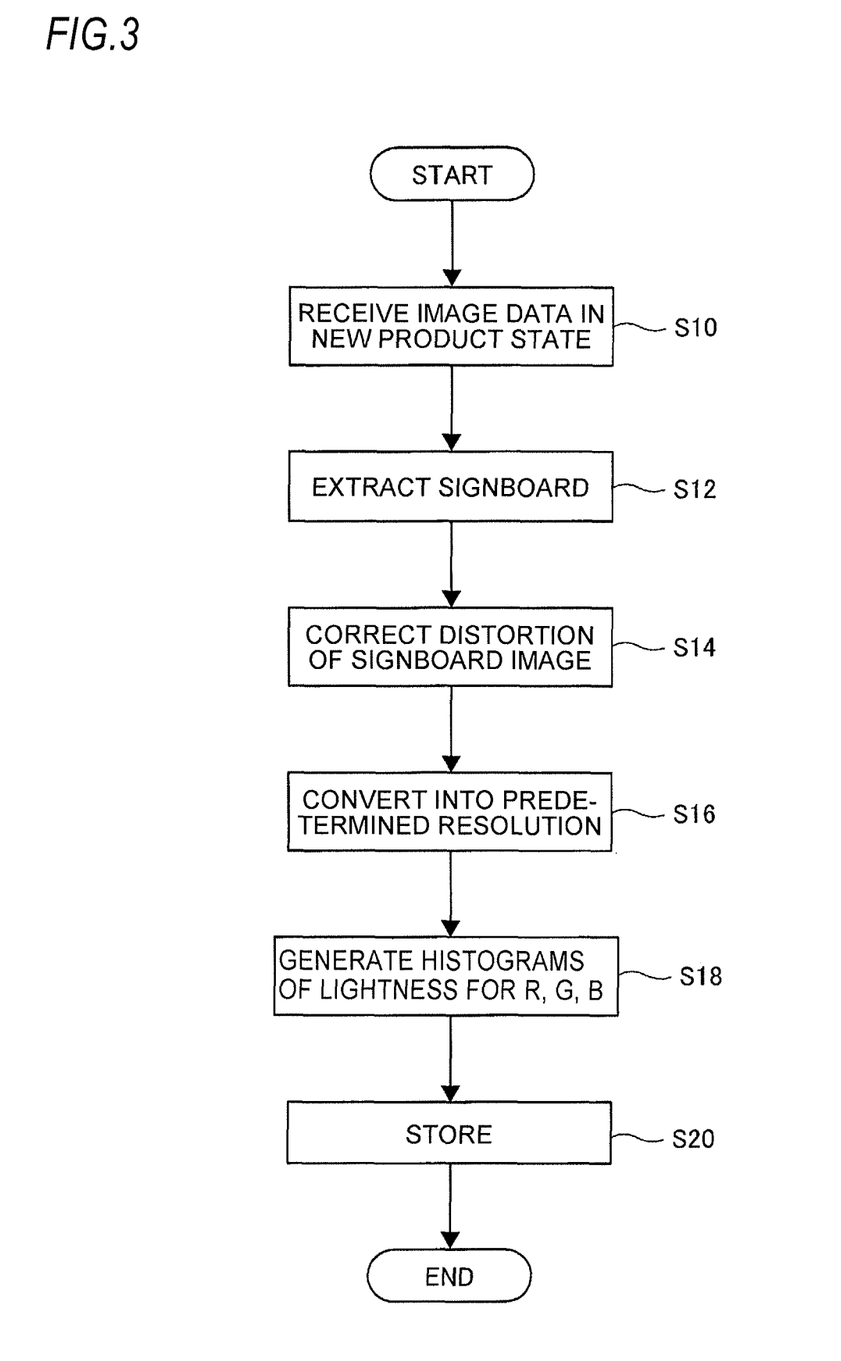
FIG. 3 is a flowchart illustrating a processing flow for a new product state by the deterioration measuring apparatus according to the exemplary embodiment of the present invention.

FIG. 3 is a flowchart illustrating a processing flow for a new product state by the deterioration measuring apparatus 20.

First, in step S10, image data of the object 10 in the new product state and its surroundings which are captured by the image capturing apparatus 18 are received.

In the following step S12, a signboard which is the object 10 is extracted. When the object 10 is captured, for example, at night, the object 10 has a brightness that is different from that of the surroundings. Thus, a portion having a high brightness may be extracted.

In the following step S14, a distortion of the object 10 is corrected. In the correction of the distortion, for example, an exact original image of the object 10 is compared to the captured image of the object 10, and the image of the object 10 is subjected to, for example, affine transformation so as to overlap the original image.

In the following step S16, the resolution of the image of the object 10 corrected in step S14 is reduced to a predetermined resolution. Meanwhile, depending on a utilization form, the resolution may not be adjusted or conversely, a process of increasing the resolution may be performed.

Figure 6A:
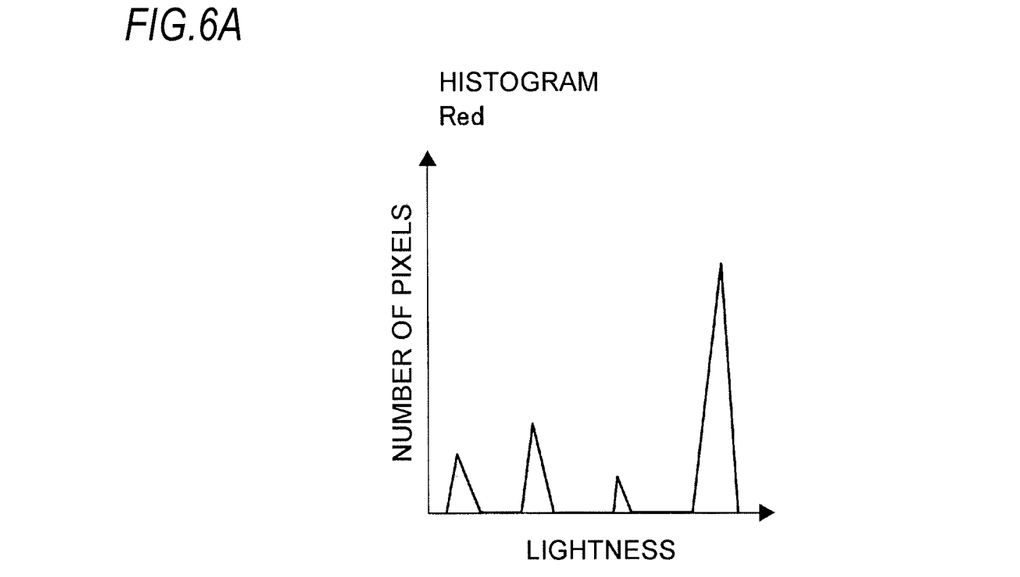
FIGS. 6A to 6C are graphs illustrating R, G, and B histograms generated in the new product state in the exemplary embodiment of the present invention.
Figure 6B:
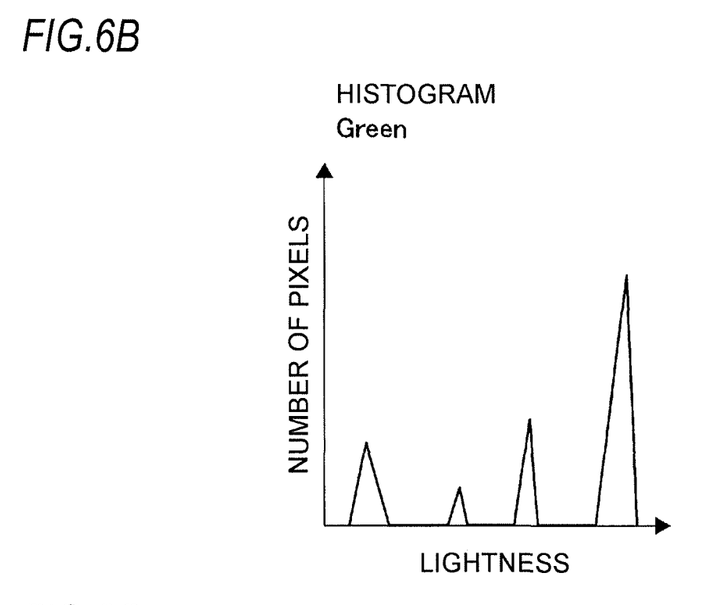
Figure 6C:
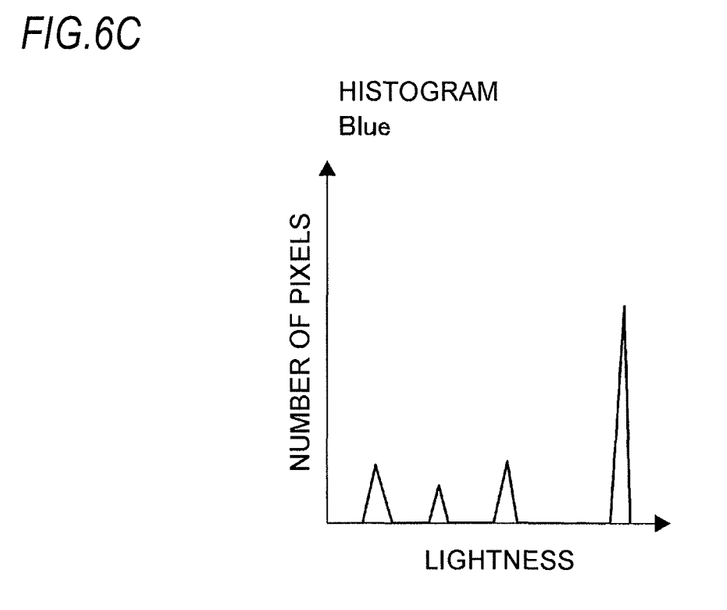

In the following step S18, a histogram of a tone (lightness) is generated for each of R, G, and B. That is, for each color, the number of pixels belonging to each tone is counted, and the histograms illustrated in FIGS. 6A to 6C are generated.

In the following step S20, the histograms generated in step S18 are stored in the memory 24, and then the process is ended.

Figure 4:
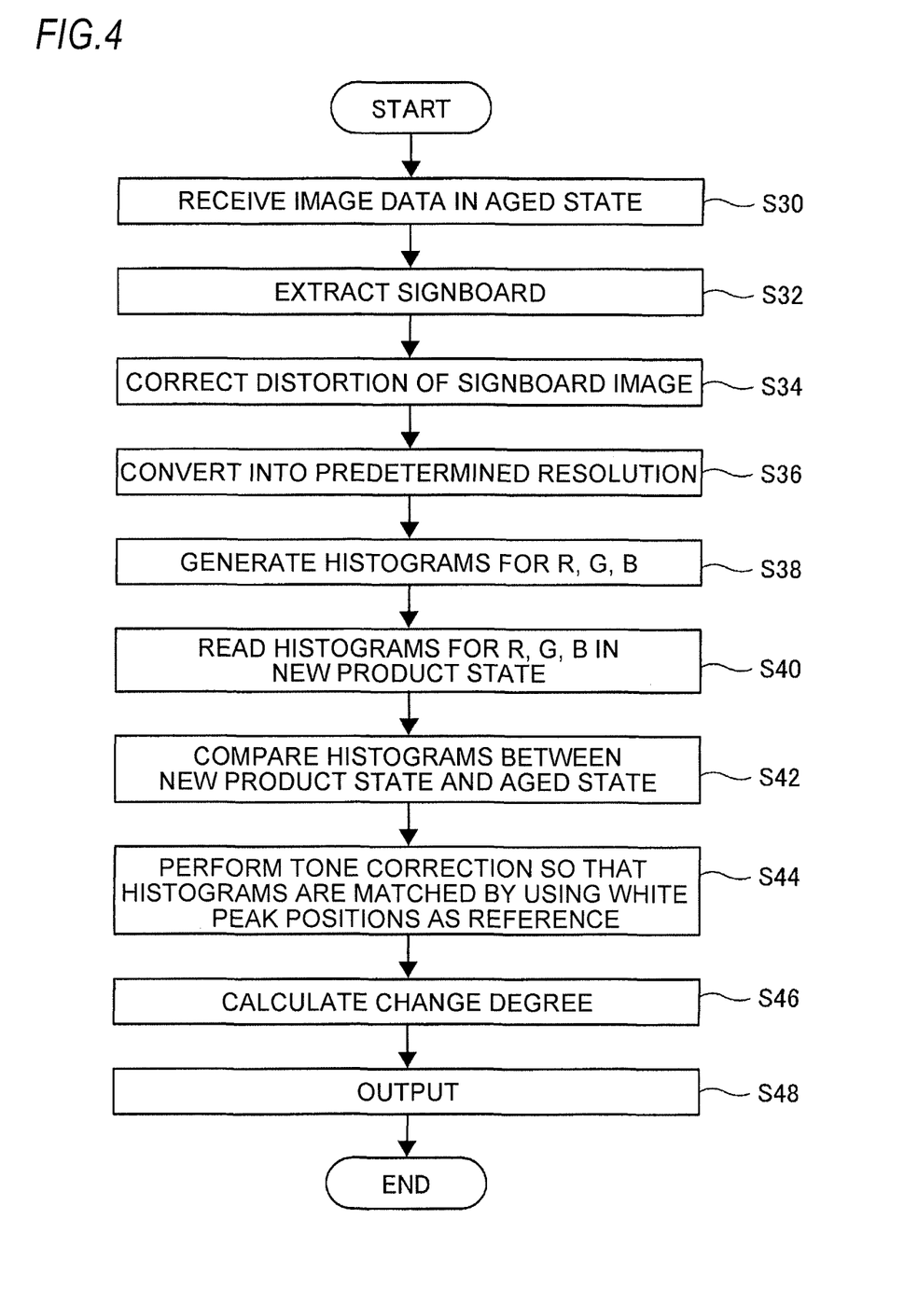
FIG. 4 is a flowchart illustrating a processing flow for an aged state by the deterioration measuring apparatus according to the exemplary embodiment of the present invention.
Figure 5:
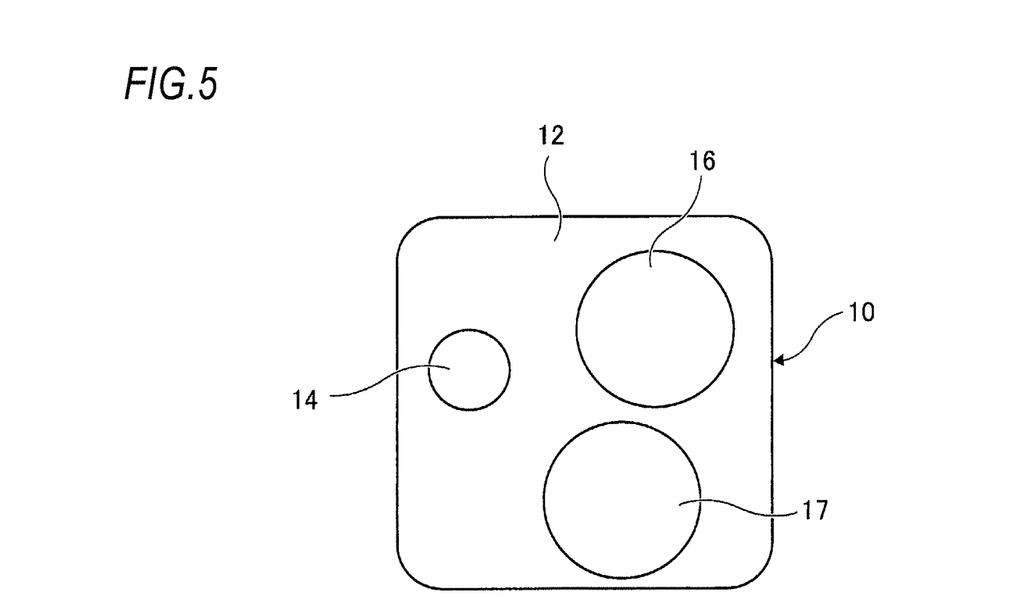
FIG. 5 is an image diagram of an extracted signboard in the exemplary embodiment of the present invention.

FIG. 4 is a flowchart illustrating a processing flow for the aged state by the deterioration measuring apparatus 20.

The processes in steps S30, S32, S34, S36 and S38 are the same as those in steps S10 to S18 in the above described processing flow for the new product state.

Figure 7:
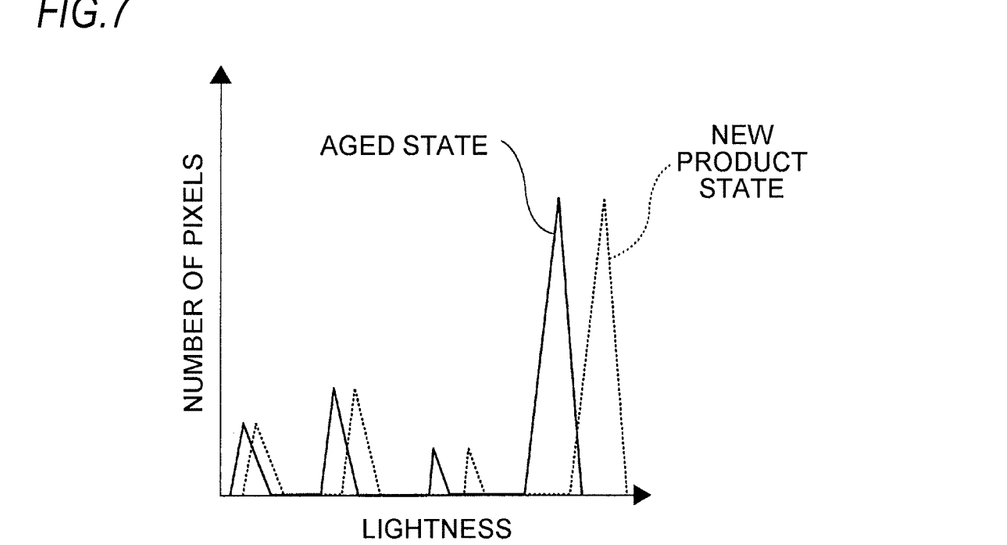
FIG. 7 is a graph illustrating uncorrected red histograms generated in the new product state and the aged state in the exemplary embodiment of the present invention.

In the following step S40, the histograms of the new product state, which is stored in the memory 24, are read. Then, in the following step S42, as illustrated in FIG. 7, the histograms of the new product state and the histograms of the aged state are compared with each other.

Here, the new product state and the aged state are different from each other in capturing environment. Thus, if the both histograms are simply compared with each other, the deterioration measurement may be inaccurate.

Figure 8A:
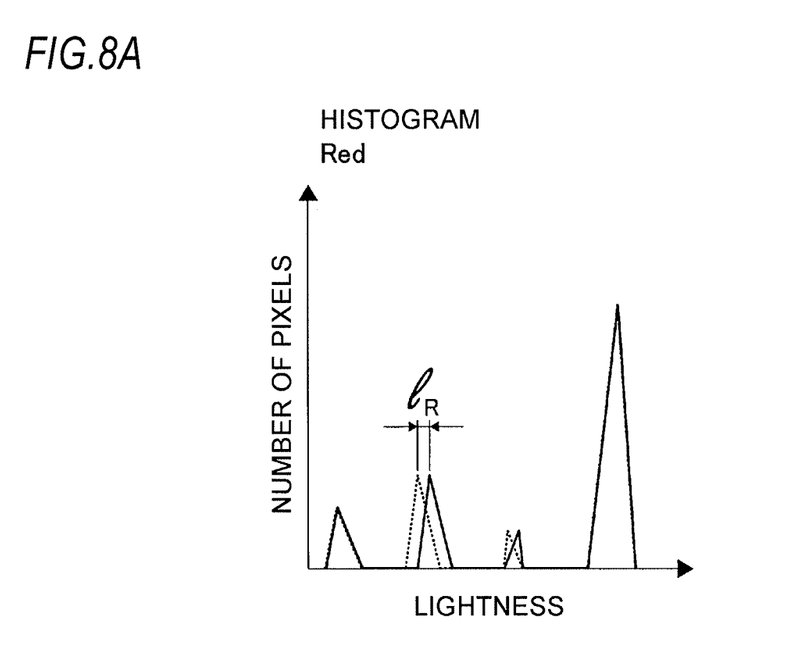
FIGS. 8A to 8C are graphs illustrating corrected R, G, and B histograms generated in the new product state and the aged state in the exemplary embodiment of the present invention.
Figure 8B:
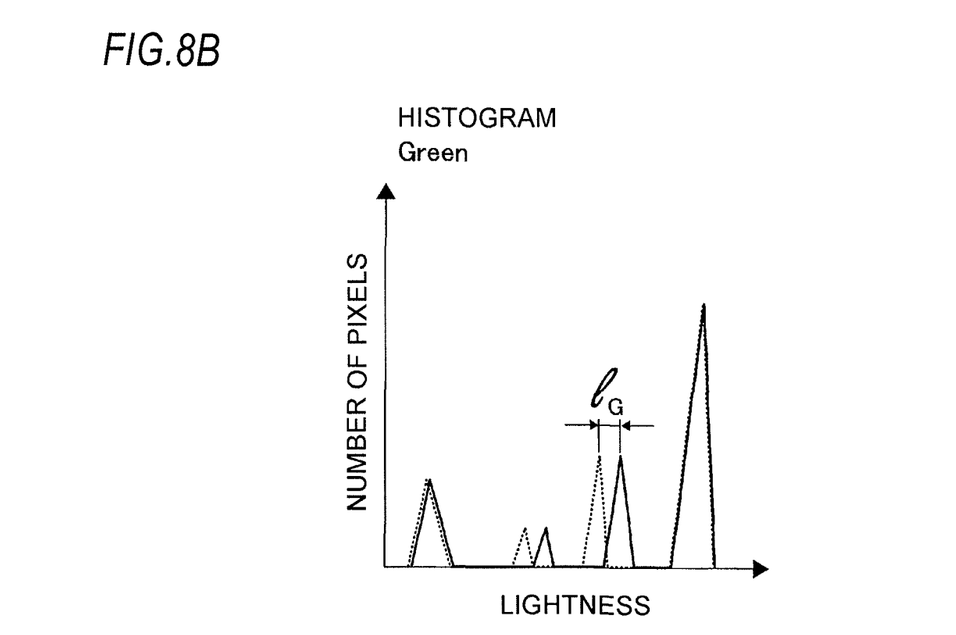
Figure 8C:
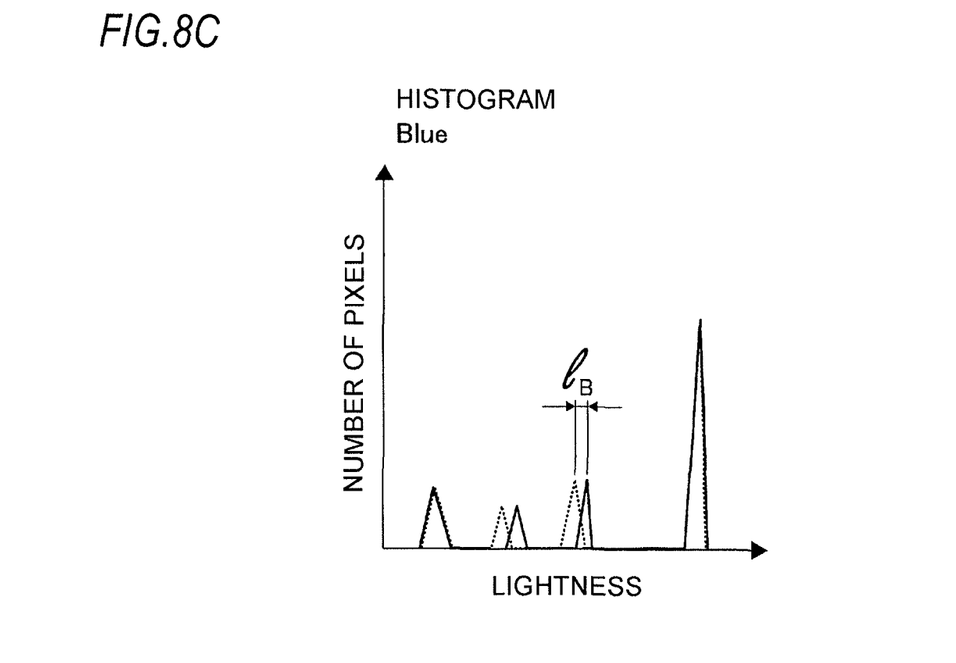

Therefore, in the following step S44, as illustrated in FIGS. 8A to 8C, a tone correction is performed such that the histograms of the new product state and the aged state are matched with each other by using white peak positions (at which lightness values are large) of the histograms as a reference. A comparison between the histograms corrected as described above is illustrated in FIGS. 8A to 8C.

In the exemplary embodiment, the tone correction is performed based on the white color. Alternatively, the tone correction may be performed based on any of other achromatic colors (for example, black or gray (having small lightness values)).

As can be seen from FIGS. 8A to 8C, green and red are larger in a deviation amount of a peak between the new product state and the aged state than blue.

In the following step S46, a deterioration degree is calculated by using a peak deviation amount ($l_B$) of blue, and a peak deviation amount ($l_G$) or ($l_R$) of green or red as expressed in Equations (1) or (2) below. The obtained peak deviation amounts ($l_G$), ($l_R$), and ($l_B$) of green, red, and blue increase as the deterioration of the object progresses. Thus, at least one of the peak deviation amounts ($l_G$), ($l_R$), and ($l_B$) is used as the deterioration degree. Here, it is proper to use a deviation amount of red or green containing a component of yellow that relatively easily deteriorates.

Also, since green contains a yellow component in a larger amount than red, the calculation may be made by Equation (1).

Also, as expressed in Equation (3), an average of deviation amounts of red and green which contain the yellow component in a relatively large amount may be compared to a deviation amount blue that contains the yellow component in a relatively small amount.

$$\text{Deterioration degree} = \frac{\text{Peak deviation amount}(l_G)}{\text{Peak deviation amount}(l_B)} \quad (1)$$

$$\text{Deterioration degree} = \frac{\text{Peak deviation amount}(l_R)}{\text{Peak deviation amount}(l_B)} \quad (2)$$

$$\text{Deterioration degree} = \frac{\text{Peak deviation amount}(l_R) + \text{Peak deviation amount}(l_G)}{\text{Peak deviation amount}(l_B) \times 2} \quad (3)$$

Then, in the following step S48, the deterioration degree is output to the output apparatus 34, and the process is ended. As the deterioration degree, the data calculated in step S46 may be output as it is. Alternatively, when the deterioration degree exceeds a threshold, a message indicating that repairing is needed may be displayed, or a deterioration level, e.g., level 1, level 2 or the like may be displayed.

Meanwhile, in the exemplary embodiment, the deterioration measuring apparatus 20 is implemented by a personal computer, but the present invention is not limited thereto. For example, the image capturing apparatus 18 may have all or a part of the functions of the deterioration measuring apparatus 20.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A change degree deriving apparatus comprising:
a receiving unit configured to receive: (i) first image data of an object, the object including an achromatic color and at least one chromatic color, the at least one chromatic color including a first color; and (ii) reference image data of the object, the first image data relating to the first color; and
a deriving unit configured to derive a change degree of the object from a first difference based on the first image data and the reference image data received by the receiving unit, wherein
the first difference is a difference between: (i) the first image data; and (ii) the reference image data, wherein
the deriving unit derives, from the first difference, a deviation amount between the first image data and the reference image data, which occurs at a portion corresponding to a histogram of the at least one chromatic color when a tone correction is performed such that a portion corresponding to the achromatic color in a histogram of the first image data and a portion corresponding to the achromatic color in a histogram of the reference image data are matched with each other, each histogram has axes of a lightness and a number of pixels, an amount of deterioration of the first color is calculated by determining the amount of deviation between a peak of the histogram of the first image data and a peak of the histogram of the reference image data, and when the amount of deterioration exceeds a threshold, an indication of the amount of deterioration is output to an output apparatus.

2. The change degree deriving apparatus according to claim 1, wherein the at least one chromatic color of the object further includes a second color that is different from the first color, the receiving unit receives second image data of the object, the second image data relating to the second color, the deriving unit derives the change degree of the object from a ratio of the first difference to a second difference, and the second difference is a difference between: (i) the second image data; and (ii) the reference image data.

3. The change degree deriving apparatus according to claim 2, wherein the deriving unit derives, from the second difference, a deviation amount between the second image data and the reference image data, which occurs a portion corresponding to the histogram of the at least one chromatic color when a tone correction is performed such that the portion corresponding to the achromatic color in a histogram of the second image data and the portion corresponding to the achromatic color in a histogram of the reference image data are matched with each other, and each histogram has axes of a lightness and a number of pixels.

4. The change degree deriving apparatus according to claim 1, wherein the first color is red or green.

5. The change degree deriving apparatus according to claim 2, wherein the first color is red or green, and
the second color is blue.

6. A change degree deriving method comprising:

receiving: (i) first image data of an object, the object including an achromatic color and at least one chromatic color, the at least one chromatic color including a first color; and (ii) reference image data of the object, the first image data relating to the first color; and deriving a change degree of the object from a first difference based on the received first image data and the received reference image data, wherein the first difference is a difference between: (i) the first image data; and (ii) the reference image data;

using, as the first difference, a deviation amount between the first image data and the reference image data, which occurs at a portion corresponding to a histogram of the at least one chromatic color when a tone correction is performed such that a portion corresponding to the achromatic color in a histogram of the first image data and a portion corresponding to the achromatic color in a histogram of the reference image data are matched with each other, wherein each histogram has axes of a lightness and a number of pixels, and an amount of deterioration of the first color is calculated by determining the amount of deviation between a peak of the histogram of the first image data and a peak of the histogram of the reference image data; and when the amount of deterioration exceeds a threshold, outputting an indication of the amount of deterioration to an output apparatus.

7. A non-transitory computer readable medium storing a program that causes a computer to execute a change degree deriving process, the process comprising:

receiving: (i) first image data of an object, the object including an achromatic color and at least one chromatic color, the at least one chromatic color including a first color; and (ii) reference image data of the object, the first image data relating to the first color; and deriving a change degree of the object from a first difference based on the received first image data and the received reference image data, wherein the first difference is a difference between: (i) the first image data; and (ii) the reference image data;

using, as the first difference, a deviation amount between the first image data and the reference image data, which occurs at a portion corresponding to a histogram of the at least one chromatic color when a tone correction is performed such that a portion corresponding to the achromatic color in a histogram of the first image data and a portion corresponding to the achromatic color in a histogram of the reference image data are matched with each other, wherein each histogram has axes of a lightness and a number of pixels, and an amount of deterioration of the first color is calculated by determining the amount of deviation between a peak of the histogram of the first image data and a peak of the histogram of the reference image data; and when the amount of deterioration exceeds a threshold, outputting an indication of the amount of deterioration to an output apparatus.

* * * * *